US012330703B2

(12) United States Patent
Robaina (10) Patent No.: US 12,330,703 B2
(45) Date of Patent: Jun. 17, 2025

(54) MOBILE WELDING CART WITH LIFT, STORAGE, AND POWER OPTIONS

(71) Applicant: RDI (ROBAINA DESIGN INNOVATIONS) LLC, Newport Beach, CA (US)

(72) Inventor: Roberto E. Robaina, Cerritos, CA (US)

(73) Assignee: RDI (Robaina Design Innovations) LLC, Newport Beach, CA (US)

( * ) Notice: Subject to any disclaimer, the term of this patent is extended or adjusted under 35 U.S.C. 154(b) by 330 days.

(21) Appl. No.: 17/969,625

(22) Filed: Oct. 19, 2022

(65) Prior Publication Data

US 2023/0120884 A1     Apr. 20, 2023

Related U.S. Application Data

(60) Provisional application No. 63/257,121, filed on Oct. 19, 2021.

(51) Int. Cl.
    *B62B 3/10*     (2006.01)
    *B23K 37/02*    (2006.01)
            (Continued)

(52) U.S. Cl.
    CPC .......... *B62B 3/104* (2013.01); *B23K 37/0205* (2013.01); *B62B 3/005* (2013.01);
            (Continued)

(58) Field of Classification Search
    CPC .......... B62B 3/104; B62B 3/005; B62B 3/02; B62B 5/00; B62B 2202/48;
            (Continued)

(56) References Cited

U.S. PATENT DOCUMENTS 4,655,466 A * 4/1987 Hanaoka ................... B62B 3/02
                                                      187/269
5,113,972 A    5/1992 Haak, Sr.
            (Continued)

FOREIGN PATENT DOCUMENTS

BR    102015002374 A2 * 10/2016
CN       106043381 A  * 10/2016    ........... B29C 31/006
            (Continued)

OTHER PUBLICATIONS

PCT/US2022/047181. International Search Report & Written Opinion (Feb. 1, 2023).
            (Continued)

*Primary Examiner* — James A Shriver, II
*Assistant Examiner* — Ian Bryce Shelton
(74) *Attorney, Agent, or Firm* — Heidi Eisenhut; LOZA & LOZA, LLP (57) ABSTRACT

A mobile welding cart designed to incorporate and integrate components to lift the welding unit, and to provide power for accessory components and tools, is provided. The cart comprises a base frame, supported by four wheels, connected to a lifting platform by way of a scissor lift mechanism. The lifting platform is operable between an expanded position and a retracted position. A storage compartment is located on the lifting platform and a welder is located on top of the storage compartment. The cart also includes a power box connected directly to the rear of the storage compartment that is designed to receive power from a single extension cord connected to the input power of choice. This power box may provide power to all required components and may be equipped with components to convert the power emanating from a power supply in the power box.

12 Claims, 4 Drawing Sheets

(51) Int. Cl.
  *B62B 3/00* (2006.01)
  *B62B 3/02* (2006.01)
  *B62B 5/00* (2006.01)
(52) U.S. Cl.
  CPC .................. *B62B 3/02* (2013.01); *B62B 5/00* (2013.01); *B62B 2202/48* (2013.01); *B62B 2206/06* (2013.01)
(58) Field of Classification Search
  CPC .......... B62B 2206/06; B62B 2202/022; B62B 2203/10; B23K 37/0205; B23K 37/0294
  See application file for complete search history.

(56) References Cited

U.S. PATENT DOCUMENTS

| | | | |
|---|---|---|---|
| 6,343,556 B1 | 2/2002 | Lanphear | |
| 6,596,972 B1* | 7/2003 | Di Novo | B23K 9/32 |
| | | | 219/136 |
| 6,897,406 B2 | 5/2005 | Crisler et al. | |
| 7,114,732 B1 | 10/2006 | Ismail | |
| 7,252,297 B1* | 8/2007 | Barritt | B23K 7/10 |
| | | | 280/79.5 |
| 8,167,322 B2* | 5/2012 | Greene | B62B 3/104 |
| | | | 280/79.5 |
| 8,188,405 B2* | 5/2012 | Martin | B23K 37/003 |
| | | | 219/136 |
| 8,748,777 B2* | 6/2014 | Ertmer | B23K 9/32 |
| | | | 219/136 |
| 9,132,848 B2* | 9/2015 | Sekine | B62B 5/0069 |
| 9,149,892 B2* | 10/2015 | Liebert | B23K 9/32 |
| 9,162,696 B2* | 10/2015 | Sekine | B62B 5/0069 |
| 9,205,746 B2* | 12/2015 | Sekine | B60L 50/52 |
| 10,046,411 B2* | 8/2018 | Dessart | H05K 7/14324 |
| 10,053,124 B2* | 8/2018 | Intravatola | F17C 13/084 |
| 10,527,221 B2* | 1/2020 | Grappe | B62B 5/0033 |
| 10,843,616 B2* | 11/2020 | Lai | B62B 3/02 |
| 11,084,130 B2* | 8/2021 | Dessart | B23K 37/0294 |
| 11,766,734 B2* | 9/2023 | Dessart | H05K 7/14324 |
| | | | 219/130.1 |
| 12,005,948 B2* | 6/2024 | Bornemann | B62B 5/064 |
| 2006/0043081 A1* | 3/2006 | Martin | B23K 9/285 |
| | | | 219/130.1 |
| 2007/0031231 A1* | 2/2007 | Powell | B66F 9/06 |
| | | | 414/629 |
| 2012/0032408 A1* | 2/2012 | Greene | B62B 3/104 |
| | | | 280/47.35 |
| 2012/0068041 A1* | 3/2012 | Flattinger | B23K 37/0294 |
| | | | 248/672 |
| 2014/0014886 A1* | 1/2014 | Ruth sen. | B66F 7/065 |
| | | | 254/122 |
| 2014/0069906 A1* | 3/2014 | Dessart | B23K 9/323 |
| | | | 219/136 |
| 2014/0070506 A1* | 3/2014 | Sammons | B62B 3/02 |
| | | | 29/428 |
| 2015/0321891 A1* | 11/2015 | Mohr | B66F 7/28 |
| | | | 254/122 |
| 2016/0375919 A1* | 12/2016 | Wright | B62B 3/02 |
| | | | 119/165 |
| 2017/0129035 A1* | 5/2017 | Westlake | B23K 9/1006 |
| 2018/0079438 A1* | 3/2018 | Intravatola | F17C 13/085 |
| 2018/0172204 A1* | 6/2018 | Grappe | A47C 4/38 |
| 2019/0092210 A1* | 3/2019 | Marcusen | B62B 5/0089 |
| 2019/0299341 A1* | 10/2019 | Dessart | B23K 9/10 |
| 2020/0361510 A1* | 11/2020 | Bornemann | B23K 37/0282 |
| 2021/0114133 A1* | 4/2021 | Dessart | B23K 9/10 |
| 2021/0323102 A1* | 10/2021 | Dessart | B23K 9/327 |
| 2024/0300565 A1* | 9/2024 | Bornemann | B62B 5/064 |

FOREIGN PATENT DOCUMENTS

| | | | |
|---|---|---|---|
| CN | 107021432 A | * | 8/2017 |
| CN | 110239604 A | * | 9/2019 |
| FR | 3049559 A1 | * | 10/2017 |

OTHER PUBLICATIONS

L J Welding Automation. Pipe Welding Positioners: Benchtop Positioner Scissor Lift Cart. The Wayback Machine. https://web.archive.org/web/20210812041441/https://www.ljwelding.com/products/welding-positioners/bench-top-positioners/benchtop-scissor-lift-cart-12lt-200/> (Aug. 12, 2021).

* cited by examiner

MOBILE WELDING CART WITH LIFT, STORAGE, AND POWER OPTIONS

CROSS REFERENCE TO RELATED APPLICATIONS

This application claims priority to a provisional application, U.S. Ser. No. 63/257,121, filed Oct. 19, 2021, entitled MOBILE WELDING CART WITH LIFT, STORAGE, AND POWER OPTIONS, which is hereby incorporated by reference.

FIELD

Various embodiments of the present disclosure pertain to welding equipment carts, scissor lift carts, and related accessories.

BACKGROUND

Whenever a greatly useful process is developed, such as the process of welding, accessories will be made to improve ease, efficiency, mobility, and user comfort to better achieve that process. Such is the place of the welding cart to the welding process.

The welding process requires a user to transport a heavy welding unit, one or more heavy gas cylinders, tools, safety ware, and other relevant equipment to and from each welding position. Thus, many welding carts have been developed to aid the user in transportation and have been around in some form for many years. Simple carts may be designed as a two-wheeled hand truck, pulled from place to place, while larger units may require a sturdier four-wheeled cart of which many designs exist for specific functions. Designs exist as attachments to automobiles and designs exist for extreme terrain.

However, there are still improvements that should be made to improve the user's efficiency and productivity that are not yet addressed by the current selection of welding carts available.

Specifically, during the welding process it is often necessary to make adjustments to the welder in order to achieve the best weld. A specific weld may have initial voltage and amperage recommended suggestions based on the welding wire, material thickness, and material composition; however, a skilled user will make continuous fine adjustments to any available parameters provided by the unit to ensure the best possible weld. Each adjustment means a stop to the process while the user addresses the welding unit. And each new weld, even if the parameters are similar, may require the user to start the tuning process over again.

Current welding carts place the welding unit at a fixed location, often nearer to the ground to keep center of mass low. Thus, every time the user is required to address the welding unit to make an adjustment, he/she must bend down, squat, or otherwise lower themselves to a position to see and interact with the welding unit. A user who is constantly making such adjustments may find that current welding carts lead to all the problems associated with equipment that is not ergonomically designed.

Also, during the welding process, it may be useful to have electrical power at your disposal. For instance, multiple power tools may be used, or desirable, to clean a weld site prior to work. Battery powered tools need recharging, and corded tools need outlets. If the nearest outlet is a fair distance away, multiple trips back and forth may be in order, wasting time, and/or a long extension cord may be required which may create tripping hazards or otherwise be in the way of other operations. Thus, having power at the exact job site would be useful, and is not available with current welding carts.

SUMMARY

The following presents a simplified summary of one or more implementations in order to provide a basic understanding of some implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a mobile welding cart is provided. The welding cart includes a base frame having a base section, the base section comprising first and second parallel base struts connected by a first cross member and a second cross member connecting the first and second parallel base struts to define an opening; a lifting platform detachably connected to the base section of the base frame; a storage compartment mounted to the lifting platform; a welder mounted to the storage compartment; a scissor lift mechanism mechanically coupling the lifting platform and the base section to allow for expansion and retraction of the lifting platform with respect to the base section; a stationary platform secured to, and extending rearwardly outward from, the second cross member of the base section; and a power box connected directly to the rear of the storage compartment, the power box receives power from a single extension cord connected to an input power According to one feature, the stationary platform is configured to store one or more cylinders.

According to another feature, the scissor lift mechanism comprises a first pair of scissor arms having a first arm and a second arm hingedly connected together at a first center for pivoting about a first pivot point, where the first arm has a first upper arm end and an opposing first lower arm end, and where the second arm has a second upper arm end and an opposing a second lower arm end; a second pair of scissor arms having a third arm and a fourth arm hingedly connected together at a second center for pivoting about a second pivot point, where the third arm has a third upper arm end and an opposing third lower arm end, and where the fourth arm has a fourth upper arm end and an opposing a fourth lower arm end; wherein the first and third upper arm ends are pivotally connected to the lifting platform and the second and fourth lower arm ends are pivotally connected to the first and second parallel base struts of the base frame, wherein the first parallel base strut includes a first elongated recess and configured to slidably receive the second lower arm end; and wherein the second parallel base strut includes a second recess and configured to slidably receive the fourth lower arm end.

According to yet another feature, wherein the stationary platform has a width larger than a width of the base frame.

According to yet another feature, the single source of power provides power to multiple components on the cart.

According to yet another feature, the portable cart further includes a pair of wheels secured to the stationary platform; a first wheel platform secured to an outer side surface of the first parallel base strut; a second wheel platform secured to an outer side surface of the second parallel base strut; a first caster mounted to a bottom surface of the first wheel platform; and a second caster mounted to a bottom surface of the second wheel platform.

According to another aspect, a mobile welding cart is provided. The mobile welding cart includes a base frame having a base section, the base section comprising first and second parallel base struts connected by a first cross member and a second cross member connecting the first and second parallel base struts to define an opening; a lifting platform detachably connected to the base section of the base frame; a storage compartment mounted to the lifting platform; a welder mounted to the storage compartment; a scissor lift mechanism mechanically coupling the lifting platform and the base section to allow for expansion and retraction of the lifting platform with respect to the base section; a stationary platform secured to, and extending rearwardly outward from, the second cross member of the base section; a power box connected directly to the rear of the storage compartment, the power box receives power from a single source connected to an input power; a first pair of scissor arms having a first arm and a second arm hingedly connected together at a first center for pivoting about a first pivot point, where the first arm has a first upper arm end and an opposing first lower arm end, and where the second arm has a second upper arm end and an opposing a second lower arm end; a second pair of scissor arms having a third arm and a fourth arm hingedly connected together at a second center for pivoting about a second pivot point, where the third arm has a third upper arm end and an opposing third lower arm end, and where the fourth arm has a fourth upper arm end and an opposing a fourth lower arm end; wherein the first and third upper arm ends are pivotally connected to the lifting platform and the second and fourth lower arm ends are pivotally connected to the first and second parallel base struts of the base frame, wherein the first parallel base strut includes a first elongated recess and configured to slidably receive the second lower arm end; and wherein the second parallel base strut includes a second recess and configured to slidably receive the fourth lower arm end.

According to one feature, the stationary platform is configured to store one or more cylinders.

According to another feature, mobile welding cart further includes a pair of wheels secured to the stationary platform; a first wheel platform secured to an outer side surface of the first parallel base strut; a second wheel platform secured to an outer side surface of the second parallel base strut; a first caster mounted to a bottom surface of the first wheel platform; and a second caster mounted to a bottom surface of the second wheel platform.

According to another aspect, a mobile welding cart is provided. The mobile welding cart consists of a base frame having a base section, the base section comprising first and second parallel base struts connected by a first cross member and a second cross member connecting the first and second parallel base struts to define an opening; a lifting platform detachably connected to the base section of the base frame; a storage compartment mounted to the lifting platform; a welder mounted to the storage compartment; a scissor lift mechanism mechanically coupling the lifting platform and the base section to allow for expansion and retraction of the lifting platform with respect to the base section; a stationary platform secured to, and extending rearwardly outward from, the second cross member of the base section; and a power box connected directly to the rear of the storage compartment, the power box receives power from a single source connected to an input power.

According to one feature, the mobile welding cart further consists of a first pair of scissor arms having a first arm and a second arm hingedly connected together at a first center for pivoting about a first pivot point, where the first arm has a first upper arm end and an opposing first lower arm end, and where the second arm has a second upper arm end and an opposing a second lower arm end; a second pair of scissor arms having a third arm and a fourth arm hingedly connected together at a second center for pivoting about a second pivot point, where the third arm has a third upper arm end and an opposing third lower arm end, and where the fourth arm has a fourth upper arm end and an opposing a fourth lower arm end; wherein the first and third upper arm ends are pivotally connected to the lifting platform and the second and fourth lower arm ends are pivotally connected to the first and second parallel base struts of the base frame, wherein the first parallel base strut includes a first elongated recess and configured to slidably receive the second lower arm end; and The novel characteristic features of this invention are set forth in the appended claims. The detail description of the invention along with mode of operation and its organization, advantages and additional objects are presented here, along with applicable drawings, for better understanding. Descriptions of specific embodiments are best understood when read in connection with these drawings.

BRIEF DESCRIPTION OF DRAWINGS

Various features, nature and advantages may become apparent from the detailed description set forth below when taken in conjunction with the drawings in which like reference characters identify correspondingly throughout.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail, so as not to unnecessarily obscure aspects of the invention.

Prior Art

Figure 1:
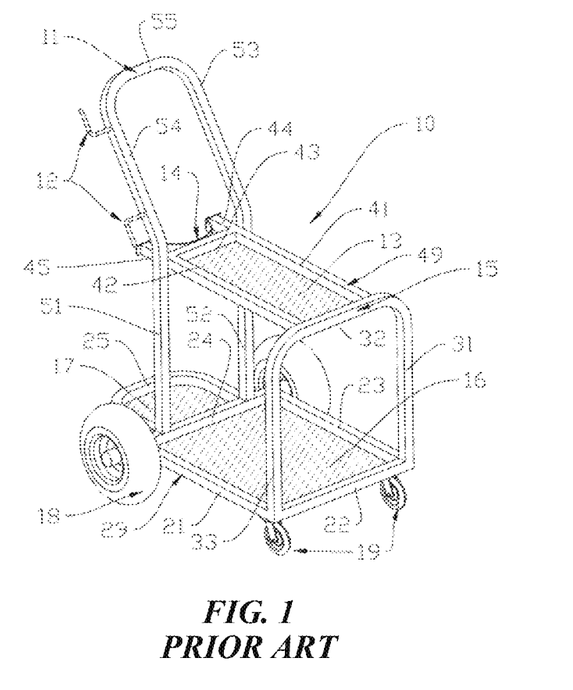
FIG. 1 illustrates prior art of a typical four-wheeled welding cart.

FIG. 1 illustrates a typical four-wheeled welding cart 10, as described in U.S. Pat. No. 8,167,322 (hereinafter the "'322 patent") titled "Stable Shop and Field Welding Cart." Such a cart is described as employing a "wider bottom platform 16 . . . to receive any of a variety of types and sizes of welding units . . . "; a "top platform 13 [which] holds tools and equipment in a location that is easy to reach" and a rear tank platform 17 to support a gas cylinder.

As described in the '322 patent, "[t]he welding cart 10 includes a bottom platform 16 supported and carried by a rectangular bottom frame 29; a back frame 11 extending upward from the bottom frame 29 and including an angled handle; a top platform 13 supported and carried by a rectangular top frame 49 that is somewhat narrower than bottom frame 29; a front frame 15 extending upward from the front corner area of the bottom frame 29 and supporting the front ends of the top platform 13 and the top frame 49; two front wheels 19; two larger back wheels 18 configured for sand, rocks, or other rough terrain; a lower tank frame 25 extending rearward from the back of bottom frame 29 supporting and carrying a tank platform 17; and an upper tank cradle 14 extending rearward from the back of top frame 49." The top frame 49 includes two horizontal top side frame elements 41, 42 and a horizontal top back mid-frame element 43. The front frame 15 includes a left front frame element 31, a top front frame element 32, and a right front frame element 33. The mid-frame element 43 is joined to the rear area of the two top side frame elements 41, 42, but offset 44, 45 from the rear ends of the two top side frame elements 41, 42 a pre-determined length.

Additionally, as described in the '322 patent, the bottom platform 16 is attached to the bottom frame 29 having two bottom side frame elements 21, 23, a bottom front frame element 22, and a bottom back frame element 24; the back frame 11 includes back left leg 52, back right leg 51, left handle upright 53, right handle upright 54, and horizontal handle portion 55. A pair of cord hangers 12 are attached to the exterior, outer edge of right handle upright 54.

The platform 16 of the cart 10 in FIG. 1 is in a fixed position relative to the base, and low to the ground. Thus, the position of the welding unit is at a low center of gravity for stability which is cumbersome to an operator who must make multiple adjustments during the welding process. Additionally, the prior art cart lacks available electrical power for any of the "tools and equipment" to be transported to the worksite.

Figure 2:
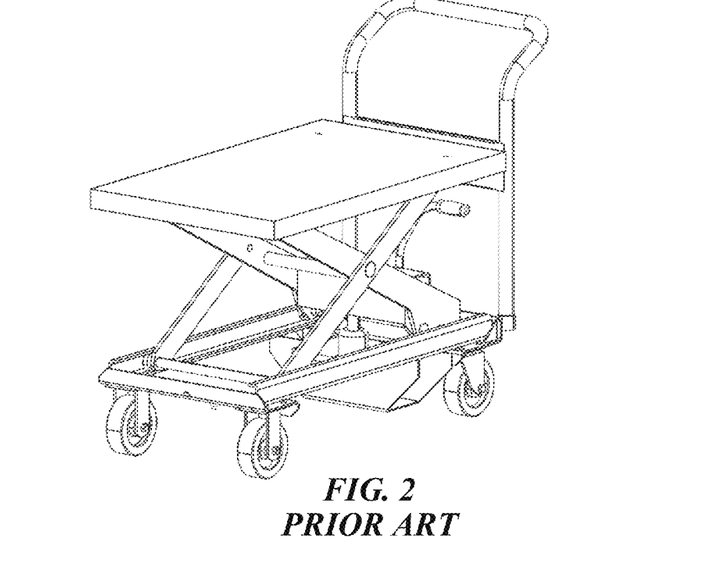
FIG. 2 illustrates prior art of a typical four-wheeled general purpose lifting cart.

FIG. 2 illustrates a typical four-wheeled general purpose lifting cart. Such a cart is capable of safely raising and lowering any cargo that is placed on the lifting table; however, no features exist to specifically utilize such a cart to the welding process. Specifically, there is no place to carry a gas cylinder nor welding unit easily, safely, and securely, nor is there is a good location to safely and effectively store tools and equipment suitable to the welding operator.

As discussed above, a welding cart design that overcomes the problems of the prior art and is made to specifically address the ergonomic needs of the user by providing a lifting system for the welding unit, provides power at the cart for accessory units, and improves the efficiency of the user is needed.

Overview

According to embodiments of the present disclosure, a novel and unique mobile welding cart designed to incorporate and integrate components to lift the welding unit, and to provide power for accessory components and tools, is provided. The cart comprises a base frame, supported by four wheels, connected to a lifting platform by way of a scissor lift mechanism. The lifting platform is operable between an expanded position and a retracted position. A storage compartment is located on the lifting platform and a welder is located on top of the storage compartment. The cart also includes a power box connected directly to the rear of the storage compartment that is designed to receive power from a single extension cord connected to the input power of choice. This power box may provide power to all required components and may be equipped with components to convert the power emanating from a power supply in the power box.

Mobile Welding Cart with Lift, Storage, and Power Options Design

The following figures intend to define a four-wheeled welding cart with capabilities of lifting the welding unit, providing electrical power availability for secondary tools, as well as the required storage for tools, equipment, and gas cylinders for the welding process.

Figure 3:
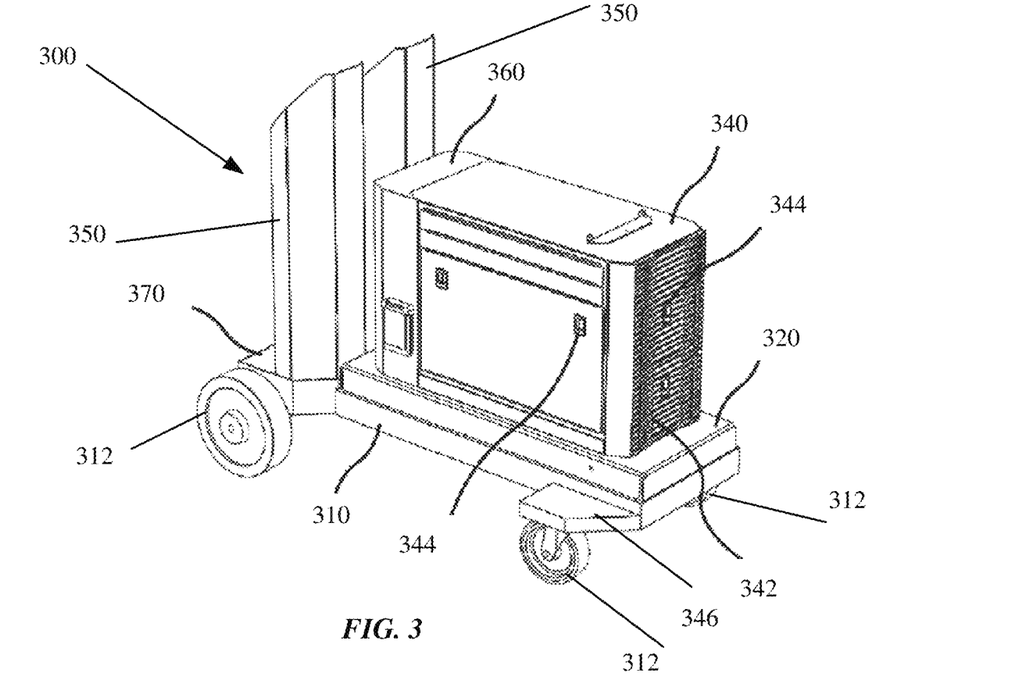
FIG. 3 illustrates the novel mobile welding cart, in accordance with an aspect of the present disclosure.
Figure 6:
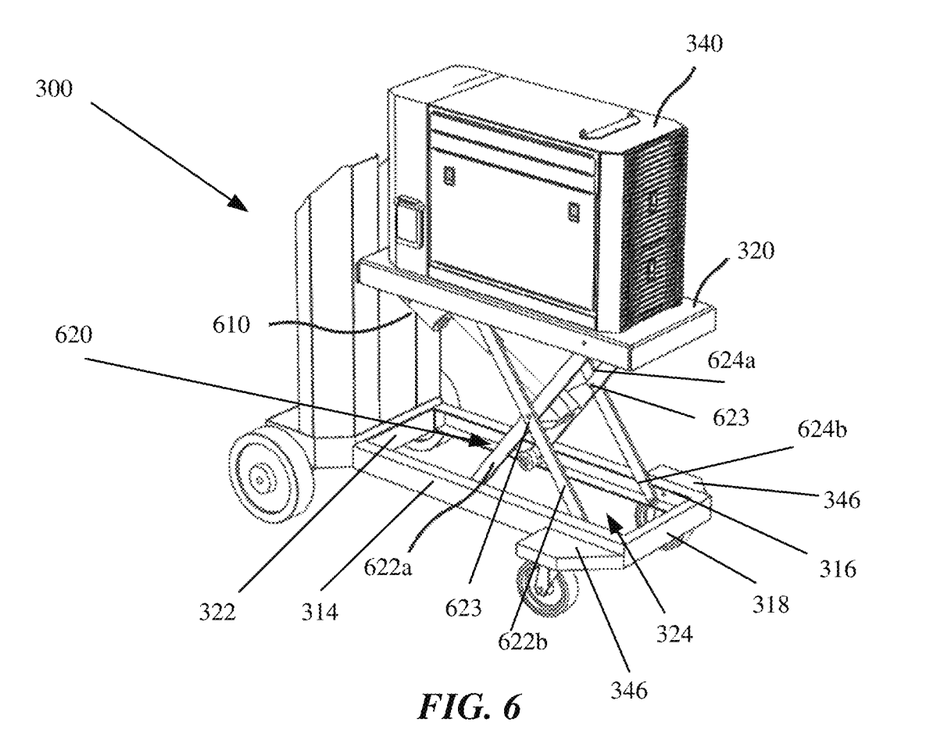
FIG. 6 illustrates the novel mobile welding cart in the raised position, in accordance with an aspect of the present disclosure.
Figure 7:
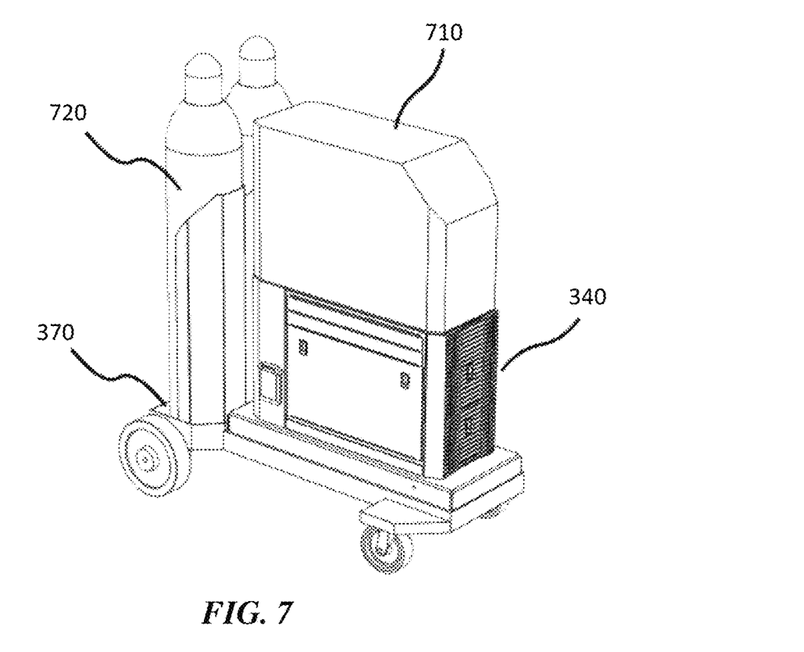
FIG. 7 illustrates the novel mobile cart in the lowered position with gas tanks and welding unit attached, in accordance with an aspect of the present disclosure.

FIG. 3 illustrates a mobile welding cart 300 in a lowered position, in accordance with one aspect of the present disclosure. This mobile welding cart 300 comprises a base frame 310, supported by four wheels 312, connected to a lifting platform 320 by way of a scissor lift mechanism 620, as shown in FIG. 6. The lifting platform 320 houses a unique storage unit (or compartment) 340 which may resemble aesthetically a welder unit 710 mounted above as shown in FIG. 7. The lifting platform 320 is operable between a lower (or retracted) position and an upper (or expanded) position. In the lowered (retracted) position the user can easily maneuver the cart to any desired location. The expanded position allows the user to adjust of the height of the lifting platform 320 to adjust to, and accommodate, the needs of the user. For example, a smaller statured individual may want the lifting platform 320 at a lower height than a larger statured person who may want the lifting platform 320 at a higher height. This also allows the height of the lifting platform 320 to be adjusted to the most ergonomic position for the user. According to one aspect, the lifting platform 320 may be fixedly secured to the lifting platform 320. Alternatively, the lifting platform 320 may be detachably secured to the lifting platform 320.

A power box 360 may be connected directly to the rear of the storage compartment 340 and is designed to receive power from a single extension cord connected to the input power of choice or availability. This power box 360 may in turn provide power to all required components and may be equipped with components to convert the power emanating from a power supply in the power box 360, if required. For example, the power box 360 may change the voltage of an electrical power source, such as from an AC source to a DC source. A stationary platform 370, designed to securely house one or more gas cylinders 720, as shown in FIG. 7, may be secured to and extending rearwardly outward from, the base frame 310. A handle (not shown) may also be attached to the mobile welding cart 300 to provide the user with a convenient way to move the cart and have built-in controls to activate certain power functions such as the lifting and lowering capabilities of the unit.

The unique storage compartment 340 may be designed with a façade, such as the face 342, and unique cosmetic features such as the latches 344, to resemble the aesthetics of different welding units. This may be desirable for certain sellers and users who use a specific brand. In another aspect, this unique mobile storage unit 340 may also take a more general look and may fill out to the extreme edges of the lifting platform 320 or even the base frame 310 of the mobile welding cart 300.

Figure 4:
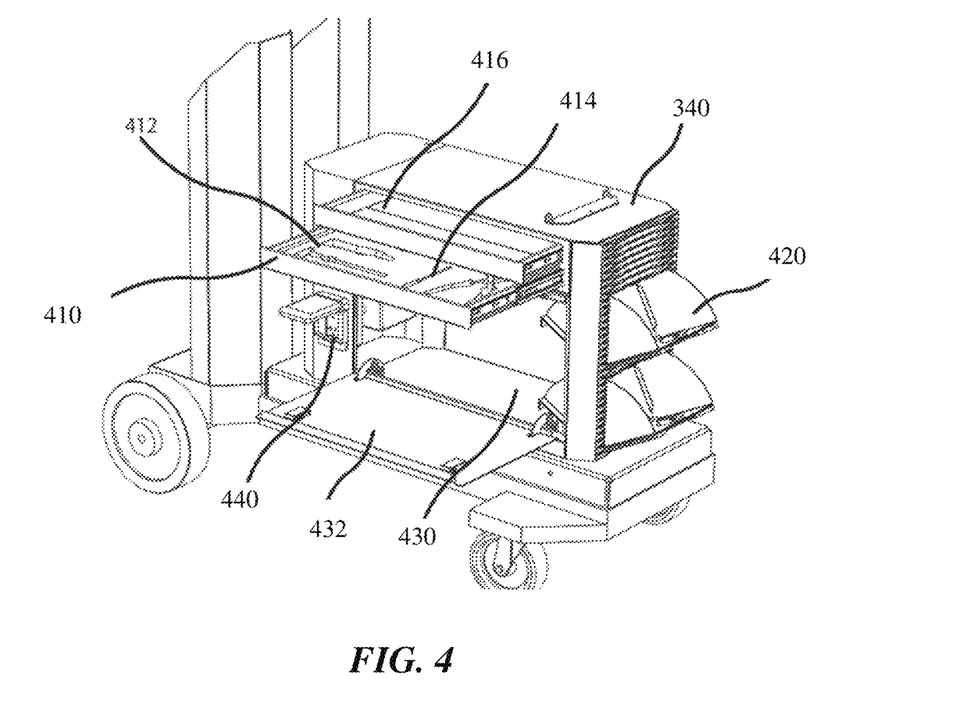
FIG. 4 illustrates the novel mobile welding cart with all drawers and covers open, in accordance with an aspect of the present disclosure.

As shown in FIG. 4, the unique storage compartment 340 may include multiple drawers 410, containers 420 and/or compartments 430 to store, for example, required tools, accessories, and safety equipment. The drawers 410 may include foam 412 or other material with relief cuts 414 to precisely house certain specific tools. Alternatively, the drawers may be without the foam (empty) 416 in order to receive any item the user can fit into the drawers 410. The current unique storage compartment 340 is portrayed with a single column of two drawers 410 stacked one atop the other, but multiple configurations are possible, including a single drawer, multiple columns of multiple drawers, or any combination thereof, depending on the needs of the user.

Containers 420 are also present as shown on the front of the unique storage unit 340. These containers may house larger tools and equipment as compared to the drawers 410, such as a welding gloves, required cords or wires, and/or secondary grinding tools. For large item storage including a welding helmet, safety jacket, large cords, and the like, an access panel 432 may be lowered to open the main compartment 430.

Figure 5:
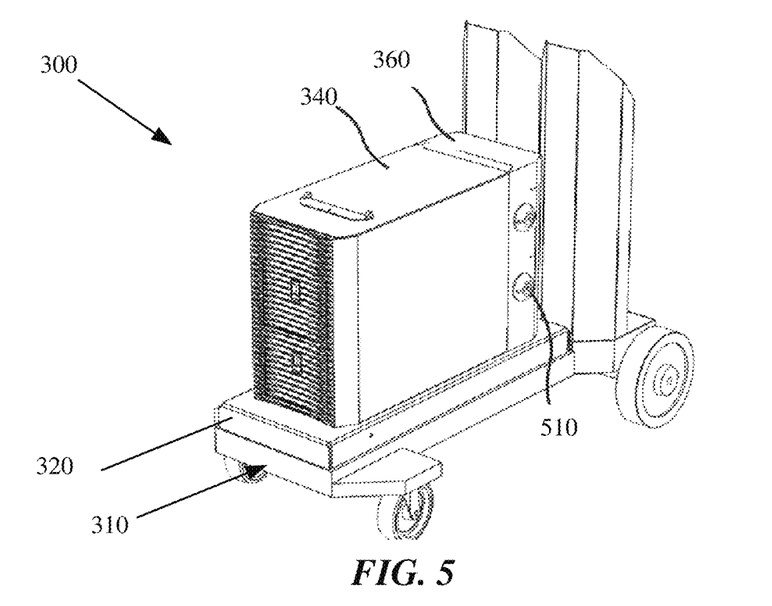
FIG. 5 illustrates the novel mobile welding cart from a secondary angle, in accordance with an aspect of the present disclosure.

The electrical power box 360 may be attached or incorporated to the rear of the unique storage compartment 340. This power box 360 can provide power to outlets such as the outlet 440, for accessory tools and or personal accessories. Electricity may be provided to the power box 360 via extension cords (not shown) which enter and or exit the side of the power box through waterproof inlets 510 as shown in FIG. 5.

Depending on the input power required by the welding unit, input power required by accessory tools, and power available from the incoming power extension cord, the power box 360 may include the necessary electronics to convert the incoming power to different voltages. Thus, if the welding unit and incoming power are 220V, but the accessory tools and outlet require 110V, a step-down voltage converter may be installed in the power box 360. Other power options and variations may be also be available depending on the incoming power (options variations combinations for other countries in the world and their compliance standards). The power box 360 may also include a small rechargeable battery designed to provide enough power to lower the unit in the event that power is lost when the mobile lifting cart is in the raised position.

FIG. 6 shows the mobile welding cart 300 of FIG. 1 in the raised position. In one aspect, power from the power box 360 is utilized to engage a linear actuator 610. The linear actuator 610 provides a force to a scissor lift type unit to raise and lower the lifting platform 320. In this fashion the lifting platform 320, and thus the contents thereon, can be raised and lowered on demand to accommodate the needs of the user. A controller located on the cart 300, or a remotely, may be used to operate the linear actuator 610.

As shown in FIG. 6, the base frame 310 has a base section, the base section comprising first and second parallel base struts 314, 316 connected by a first cross member 318 and a second cross member 322 connecting the first and second parallel base struts 314, 316 to define an opening 324. The lifting platform 320 is detachably connected to the base section of the base frame 310. The scissor lift mechanism 620 mechanically couples the lifting platform 320 and the base section to allow for expansion and retraction of the lifting platform 320 with respect to the base section. The stationary platform 370 is secured to, and extends rearwardly outward from, the second cross member 322 and may be designed to securely house one or more gas cylinders 720 (See FIG. 7) or other objects. As shown, the rear wheels of the cart are secured to the stationary platform 370 and the stationary platform 370 has a width larger than the width of the base frame 310 providing balance and stability to the cart 300 to prevent the cart 300 from tipping over.

According to one aspect, the front wheels of the cart 300 are smaller than the rear wheels. Furthermore, the front wheels may be casters secured to the bottom surfaces of wheel platforms 346 while the back wheels may be wheels that can only spin on a single axis. The wheel platforms 346 are integrally connected to, and extend horizontally outward from, outer surfaces of the first and second parallel struts 314, 316.

The scissor lift mechanism 620 connects or mechanically couples the lifting platform 320 and the base frame 310 one above the other. The scissor lift mechanism 620 comprises two pairs of scissor arms 622a, 622b and 624a, 624b. The first pair of scissor arms 622a, 622b are hingedly connected with each other in their centers so as to pivot about a scissor axis 623 and the second pair of scissor arms 624a, 624b are hingedly connected with each other in their centers so as to pivot about the scissor axis 623. As discussed above, the linear actuator 610 provides a force to the scissor lift mechanism 620 to raise and lower the lifting platform 320. In this fashion the lifting platform 320, and thus the contents thereon, can be raised and lowered on demand to accommodate the needs of the user.

The upper ends of scissor arms 622a and 624a are pivotally secured to the lifting platform 320 and the lower ends of scissor arms 622b and 624b are pivotally secured to the first and second parallel struts, respectively. The lower ends of scissor arms 622a, 624a are received within elongated recesses of the first and second parallel struts 314, 316. The elongated recesses extend the lengths of the first and second parallel struts 314, 316 and the lower ends of scissor arms 622a, 624a slide within the recesses allowing for the expansion and retraction of the lifting platform with respect to the base section. That is, the lower ends of scissor arms 622a, 624a slidably engage within the elongated recesses of the first and second parallel struts 314, 316. Furthermore, the lifting platform 320 includes elongated recesses configured to receive the upper ends of scissor arms 622b and 624b.

Figure 8:
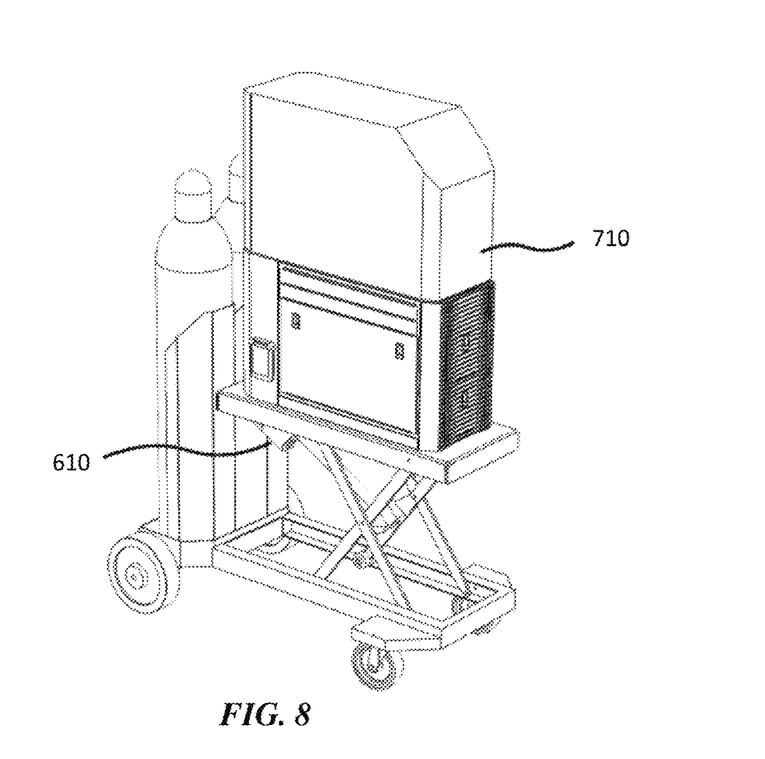
FIG. 8 illustrates the novel mobile welding cart in the raised position with gas tanks and welding unit attached, in accordance with an aspect of the present disclosure.

FIG. 7 shows the mobile welding cart 300 with the welding unit 710 installed atop the storage box 340, and two gas cylinders 720 fixed to the stationary platform 370. As stated above, when the user wishes to have easier access to the storage unit 340 or to make an adjustment to the welding unit 710, he or she can engage the scissor lift mechanism 620 via the linear actuator 610 and raise the welding unit 710 as shown in FIG. 8. Support walls 348, 350 may extend upwardly from the stationary platform 370 creating a housing area for securing the gas cylinders 720.

In one aspect, the mobile welding cart includes one or more incorporated electrical receptacles for powering external accessories.

In still another aspect, the mobile welding cart with the ability to convert any incoming power received to the power required for multiple features, including but not limited to the welder unit, lift motor, and/or electrical receptacle(s).

Alternate Embodiments

The mobile welding cart 300 of the present disclosure may include optional features not shown. For example, bumpers (not shown) around the base frame 310 may prevent damage to the cart and any surroundings when in use and stabilizing features (not shown) may extend out of the base frame 310 when the mobile welding cart 300 is in the raised position, in order to prevent tipping. Tie downs positions (not shown) can be employed for safety and stability when transporting the cart 300.

According to one aspect, the welding unit may be mounted directed to the lifting platform to lower the center of mass. Additionally, the storage compartment may be mounted above the welding unit.

According to one aspect, the power supply may include a battery for the lifting mechanism, and/or potentially for the entire unit. Alternatively, a small generator could be employed to supply power as well. In either of these cases, less or no electrical cords may be needed.

In the event that the welding unit employed is a self-contained engine driven welder, which generates its own power, the power required by the secondary units may be pulled directly from the welding unit, eliminating the need for the power box.

One or more of the components and functions illustrated in the figures may be rearranged and/or combined into a single component or embodied in several components without departing from the present disclosure. Additional elements or components may also be added without departing from the present disclosure. Additionally, the features described herein may be implemented in software, hardware, as a business method, and/or combination thereof.

While certain exemplary embodiments have been described and shown in the accompanying drawings, it is to be understood that such embodiments are merely illustrative of and not restrictive on the broad disclosure, and that this disclosure is not be limited to the specific constructions and arrangements shown and described, since various other modifications may occur to those ordinarily skilled in the art.

The invention claimed is:

1. A mobile welding cart, comprising:
a base frame having a base section, the base section comprising first and second parallel base struts connected by a first cross member and a second cross member connecting the first and second parallel base struts to define an opening;
a lifting platform detachably connected to the base section of the base frame;
a storage compartment mounted to the lifting platform;
a welder mounted to the storage compartment;
a scissor lift mechanism mechanically coupling the lifting platform and the base section to allow for expansion and retraction of the lifting platform with respect to the base section;
a stationary platform secured to, and extending rearwardly outward from, the second cross member of the base section; and
a power box connected directly to the rear of the storage compartment, the power box receives power from a single source connected to an input power.

2. The mobile welding cart of claim 1, wherein the stationary platform is configured to store one or more cylinders.

3. The mobile welding cart of claim 1, wherein the scissor lift mechanism comprises:
a first pair of scissor arms having a first arm and a second arm hingedly connected together at a first center for pivoting about a first pivot point, where the first arm has a first upper arm end and an opposing first lower arm end, and where the second arm has a second upper arm end and an opposing a second lower arm end;
a second pair of scissor arms having a third arm and a fourth arm hingedly connected together at a second center for pivoting about a second pivot point, where the third arm has a third upper arm end and an opposing third lower arm end, and where the fourth arm has a fourth upper arm end and an opposing a fourth lower arm end;
wherein the first and third upper arm ends are pivotally connected to the lifting platform and the second and fourth lower arm ends are pivotally connected to the first and second parallel base struts of the base frame,
wherein the first parallel base strut includes a first elongated recess and configured to slidably receive the second lower arm end; and
wherein the second parallel base strut includes a second recess and configured to slidably receive the fourth lower arm end.

4. The mobile welding cart of claim 1, wherein the stationary platform has a width larger than a width of the base frame.

5. The mobile welding cart of claim 1, wherein the single source of power provides power to multiple components on the cart.

6. The mobile welding cart of claim 1, further comprising:
a pair of wheels secured to the stationary platform;
a first wheel platform secured to an outer side surface of the first parallel base strut;
a second wheel platform secured to an outer side surface of the second parallel base strut;
a first caster mounted to a bottom surface of the first wheel platform; and
a second caster mounted to a bottom surface of the second wheel platform.

7. A mobile welding cart, comprising:
a base frame having a base section, the base section comprising first and second parallel base struts connected by a first cross member and a second cross member connecting the first and second parallel base struts to define an opening;
a lifting platform detachably connected to the base section of the base frame;
a storage compartment mounted to the lifting platform;
a welder mounted to the storage compartment;
a scissor lift mechanism mechanically coupling the lifting platform and the base section to allow for expansion and retraction of the lifting platform with respect to the base section;
a stationary platform secured to, and extending rearwardly outward from, the second cross member of the base section;
a power box connected directly to the rear of the storage compartment, the power box receives power from a single source connected to an input power;
a first pair of scissor arms having a first arm and a second arm hingedly connected together at a first center for pivoting about a first pivot point, where the first arm has a first upper arm end and an opposing first lower arm end, and where the second arm has a second upper arm end and an opposing a second lower arm end;
a second pair of scissor arms having a third arm and a fourth arm hingedly connected together at a second center for pivoting about a second pivot point, where the third arm has a third upper arm end and an opposing third lower arm end, and where the fourth arm has a fourth upper arm end and an opposing a fourth lower arm end;
wherein the first and third upper arm ends are pivotally connected to the lifting platform and the second and fourth lower arm ends are pivotally connected to the first and second parallel base struts of the base frame, wherein the first parallel base strut includes a first elongated recess and configured to slidably receive the second lower arm end; and wherein the second parallel base strut includes a second recess and configured to slidably receive the fourth lower arm end.

8. The mobile welding cart of claim 7, wherein the stationary platform is configured to store one or more cylinders.

9. The mobile welding cart of claim 7, further comprising:
a pair of wheels secured to the stationary platform;
a first wheel platform secured to an outer side surface of the first parallel base strut;
a second wheel platform secured to an outer side surface of the second parallel base strut;
a first caster mounted to a bottom surface of the first wheel platform; and
a second caster mounted to a bottom surface of the second wheel platform.

10. A mobile welding cart, consisting of:
a base frame having a base section, the base section comprising first and second parallel base struts connected by a first cross member and a second cross member connecting the first and second parallel base struts to define an opening;
a lifting platform detachably connected to the base section of the base frame;
a storage compartment mounted to the lifting platform;
a welder mounted to the storage compartment;
a scissor lift mechanism mechanically coupling the lifting platform and the base section to allow for expansion and retraction of the lifting platform with respect to the base section;
a stationary platform secured to, and extending rearwardly outward from, the second cross member of the base section; and
a power box connected directly to the rear of the storage compartment, the power box receives power from a single source connected to an input power.

11. The mobile welding cart of claim 10, further consisting of:
a first pair of scissor arms having a first arm and a second arm hingedly connected together at a first center for pivoting about a first pivot point, where the first arm has a first upper arm end and an opposing first lower arm end, and where the second arm has a second upper arm end and an opposing a second lower arm end;
a second pair of scissor arms having a third arm and a fourth arm hingedly connected together at a second center for pivoting about a second pivot point, where the third arm has a third upper arm end and an opposing third lower arm end, and where the fourth arm has a fourth upper arm end and an opposing a fourth lower arm end;
wherein the first and third upper arm ends are pivotally connected to the lifting platform and the second and fourth lower arm ends are pivotally connected to the first and second parallel base struts of the base frame,
wherein the first parallel base strut includes a first elongated recess and configured to slidably receive the second lower arm end.

12. The mobile welding cart of claim 1, wherein the storage compartment comprises:
one or more containers on a front of the storage compartment; and
one or more drawers located on a side of the storage compartment.

* * * * *